United States Patent [19]
Nikander

[11] Patent Number: 5,893,941
[45] Date of Patent: Apr. 13, 1999

[54] METHOD AND APPARATUS IN BENDING AND TEMPERING OF A GLASS SHEET

[76] Inventor: Risto Nikander, Kemiankatu 10, FIN-33720 Tampere, Finland

[21] Appl. No.: 08/817,773

[22] PCT Filed: Oct. 24, 1995

[86] PCT No.: PCT/FI95/00584

§ 371 Date: May 28, 1997

§ 102(e) Date: May 28, 1997

[87] PCT Pub. No.: WO96/12682

PCT Pub. Date: May 2, 1996

[30] Foreign Application Priority Data

Oct. 25, 1994 [FI] Finland ................................. 945004

[51] Int. Cl.$^6$ ................................................. C03B 23/035
[52] U.S. Cl. ..................... 65/104; 65/106; 65/107; 65/182.2; 65/279; 65/291
[58] Field of Search ........................ 65/104, 106, 107, 65/182.2, 25.4, 279, 291

[56] References Cited

U.S. PATENT DOCUMENTS

| | | | |
|---|---|---|---|
| 3,778,244 | 12/1973 | Nedelec et al. | 65/106 |
| 4,356,018 | 10/1982 | McMaster | 65/104 |
| 4,432,782 | 2/1984 | Seymour | 65/25.2 |
| 4,437,871 | 3/1984 | McMaster et al. | 65/104 |
| 5,292,355 | 3/1994 | Nikander | 65/107 |
| 5,340,375 | 8/1994 | Anttonen | 65/104 |
| 5,372,624 | 12/1994 | Lesage et al. | 65/106 |
| 5,660,609 | 8/1997 | Muller et al. | 65/107 |

FOREIGN PATENT DOCUMENTS

| | | |
|---|---|---|
| 0537182 B1 | 4/1993 | European Pat. Off. |
| WO 92/00921 | 1/1992 | WIPO |

*Primary Examiner*—Stanley S. Silverman
*Assistant Examiner*—Sean Vincent
*Attorney, Agent, or Firm*—Pollock, Vande Sande & Amernick

[57] ABSTRACT

A method and an apparatus for bending and tempering of a glass sheet is disclosed. The means to be used in the method for supporting the glass sheet is a supporting device in two parts, wherein the first supporting device forms a substantially planar supporting surface for the margin of the glass sheet and the second supporting device forms, in a manner known as such, a supporting device for the margin of the glass sheet corresponding to the bending configuration. In the method, the first supporting device supports the glass sheet to maintain its planar configuration at the heating stage required for tempering, wherein the glass sheet is being heated to the tempering temperature. During heating, the glass sheet is further supported by a pressure difference imposed on the opposite surfaces of the glass sheet. After heating, the glass sheet is moved to the second supporting device to bend to the bending configuration determined by the second supporting device, followed by the tempering stage.

10 Claims, 3 Drawing Sheets

METHOD AND APPARATUS IN BENDING AND TEMPERING OF A GLASS SHEET

FIELD OF THE INVENTION

The invention relates to a method of bending and tempering of a glass sheet, wherein in the first step the glass sheet to be bent is heated to its tempering temperature in the second step the glass sheet is bent to the bending configuration, and in the third step the glass sheet is tempered. During application of the method, the glass sheet is supported on a substantially annular supporting means. During application of the method, the glass sheet is subjected to a different pressure effect on its upper and lower surfaces.

BACKGROUND ART

In view of the prior art reference is made to publication U.S. Pat. No. 4,437,871 disclosing a bending and tempering method, where in the glass sheet is heated in a roller furnace in which the glass sheet is transported forward on rotating ceramic rollers. When the glass sheet is heated and reaches its softening temperature, its bending downwards between the rollers is prevented by the continuous movement of the glass sheet, wherein the location of supporting points, supporting the glass sheet from below, is continuously changed. In this manner, the glass sheet remains straight.

According to the method, heating of the glass sheet is continued until the glass sheet reaches also the tempering temperature which is approximately 620° C. In the next step of the method, the glass sheet is supported by rollers in the furnace apparatus at a precisely predetermined point, a vacuum mould at said point above the rollers grips the glass sheet and elevates it upwardly apart from the rollers. This step of the method requires very high precision, because the positioning of the glass sheet must be precisely determined both in view of directional displacements and rotation. Positioning errors at this step result in faulty dimensions in the finished bend and tempered glass, particularly at its margins. An excessive position error will naturally damage the whole glass. The glass sheet is elevated by the vacuum mould up from the rollers to such an extent that a bending/tempering frame can be brought under the glass sheet from outside the furnace apparatus. The glass sheet is dropped onto the bending/tempering frame from a certain height, which is usually about 30 mm. After the dropping, the glass sheet is bent by gravity into the mould shape determined by the bending/tempering frame, and it is pulled out from the furnace apparatus. In the next step, the tempering is conducted with air jets. The bending of the glass sheet is relatively quick; with the most common glass thicknesses of 3–4 mm the bending will take about 1 to 3 seconds.

The method known from U.S. Pat. No. 4,437,871 is advantageous in certain respects, particularly in large-scale production for manufacturing simple bent and tempered glass shapes in large series. However, the method usually involves several disadvantages, the most important of which is the requirement that the glass sheet must be precisely positioned at the elevating step, which is difficult in quick serial production and causes losses, as mentioned above. Another disadvantage is the fact that the vacuum mould must be coated with a soft, heat-resisting coating material to prevent damage to the surface of the hot glass sheet. This coating material must be replaced from time to time, which will naturally cause production losses and replacement costs. Furthermore, application of the method to screen-coated glass sheets will reduce the replacement time, because the silk screen ink used will stain the coating material, thus increasing the need for a replacement. Another disadvantage is also the fact that the glass sheet must, in practice, be dropped from a height of at least 20–25 mm, which may cause deformation of the glass sheet particularly at its margins.

Further in view of the prior art, a method is known from Finnish Patent No. 86054 where the glass sheet is first bent by gravity to a desired shape, using an edge mould. Thus the temperature of the glass sheet, particularly in its central areas, is clearly below 600° C. After the bending stage, the glass sheet is supported by a pressure difference effective on its opposite surfaces, wherein the pressure is higher underneath than above the glass sheet, and the temperature of the glass sheet is raised thoroughly to the tempering temperature, i.e. about 620° C. After this the glass sheet is quickly removed from the furnace apparatus to the tempering step. A quick move is necessary to prevent bending of the central areas of the glass sheet before the air jets of the tempering step cool and thus stiffen this area of the glass sheet below the softening temperature, ca. 550° C. The method according to the Finnish Patent No. 86054 has been proved functional in practice, but the critical step in applying the method is the fact that the glass sheet is already bent to its final configuration before final heating. After the final heating and the elimination of a pressure difference supporting the glass sheet, it must be quickly moved to the tempering step. If in the abovementioned steps, for some reason, e.g. adjustments in the temperature or delays, excessive bendings or sags develop that exceed the manufacturing tolerance, these accumulated extra bendings may have the result that the bent and tempered glass deviates too much from the allowed manufacturing tolerances and must be discarded.

SUMMARY OF THE INVENTION

It is an object of this invention to eliminate the problems presented above and thus to raise the level of prior art in bending and tempering. Using the method according to the invention, it is possible to position the glass sheet so that the heating and bending steps can be conducted without optical errors developing in the glass sheet, particularly deformation of the glass sheet or formation of sags. The method according to the invention is particularly advantageous in production of e.g. cylindrical glass shapes, such as to be used as car panes. The bending is thus curved in one direction, and the requirement in the direction perpendicular to this direction is a substantially straight configuration of the glass sheet. For achieving these aims, the method according to the invention is primarily characterized in that the supporting means is formed in two parts, as a substantially annular supporting device in a manner that the first supporting device forms a substantially planar annular supporting surface for the margin of the glass sheet, and the second supporting device in a manner in the art forms an annular supporting surface corresponding to the bending configuration for the margin of the glass sheet, that the planar glass sheet is heated at least from the softening temperature to the tempering temperature in connection with the first supporting device, that during heating, the substantially planar shape of the glass sheet is maintained by a pressure difference effective between the upper and lower surfaces of the glass sheet, that the pressure difference is removed when the glass sheet is at least at the tempering temperature, and that substantially simultaneously the glass sheet is placed in connection with the second supporting device, wherein the glass sheet is bent to the configuration determined by the second supporting device.

Thus, according to the invention, the first supporting device is formed as a closed annular frame structure with a planar supporting surface supporting the planar glass sheet at its margins. The pressure effect is directed at the glass sheet from inside the frame shape of the first supporting device to the central area of the glass sheet. Thus the heating of the glass sheet to the tempering temperature can be carried out so that the glass sheet can be maintained in planar shape by means of the support of the first supporting device and the pressure difference, wherein the formation of pockets is prevented and the glass sheet does not need to be moved at the critical final heating stage.

When the glass sheet has reached the tempering temperature, the supporting devices of the supporting means are moved in relation to each other in a way that the glass sheet is placed on the bearing of the second annular supporting device, wherein the pressure difference is simultaneously removed either by active measures or due to the transfer. The glass sheet is thus bent to the configuration determined by the second supporting device, and it can be removed from that compartment of the furnace apparatus where the heating and bending is conducted, to the actual tempering step, i.e. usually to the next compartment in the furnace apparatus. Consequently, the method allows a controlled heating step, and simultaneously the bending of the glass sheet can be monitored and the transfer made e.g. by suitably anticipating the bending process in a way that the tempering step can be started when the desired bending has taken place.

According to a particularly advantageous embodiment of the invention, the first and second supporting devices are placed vertically in a concentric manner for conducting the steps of the method, wherein the transfer of the supporting devices in relation to each other between the heating and bending stages is carried out in the vertical direction. Thus during heating and bending, the glass sheet is not moved in the horizontal direction nor quickly in the vertical direction, but the exchange from the first supporting device to the second supporting device can be made as a controlled exchange of supporting surface requiring a short transfer distance, wherein said annular supporting surfaces both in the first and in the second supporting device are placed at the margins of the glass sheet, as close to each other as possible.

According to the inventive method, the supporting devices can be placed either so that both supporting devices are underneath the glass sheet, wherein the supporting surface of the first supporting device is placed inside the supporting surface of the second supporting device, or in a way that the first supporting device is placed above the glass sheet.

The other characterizing features of the method according to the invention are disclosed in the appended dependent claims directed to the method.

The invention relates also to apparatus for applying the method, wherein the primarily characterizing features of the apparatus are disclosed in the appended, independent claim on the apparatus. Further, some advantageous embodiments of the apparatus are disclosed in the dependent claims on the apparatus.

BRIEF DESCRIPTION OF THE DRAWINGS

The invention will be presented in more detail in the following description, with reference to the appended drawings. The drawings show two examples of apparatuses applying the method of the invention in a schematic view: In the drawings.

DETAILED DESCRIPTION OF THE PREFERRED EMBODIMENTS

The figures show, in a cross-sectional view, the compartment 1 of the bending furnace apparatus where the method according to the invention is applied. The bending and tempering furnace apparatus may comprise several successive compartments where the glass sheet is treated in steps. The glass sheets are transferred between the compartments of the bending and tempering furnace apparatus in steps, i.e. to the next compartment when a step has been completed in a certain compartment.

Particularly when applying the method of the invention, the glass sheet can be heated from the temperature of the environment (ca. 20° C.) close to the softening temperature (ca. 550° C.) in pre-heating compartments or in compartment 1 of the bending and tempering furnace apparatus. The execution of this step will depend on the overall construction of the apparatus.

Figure 1:
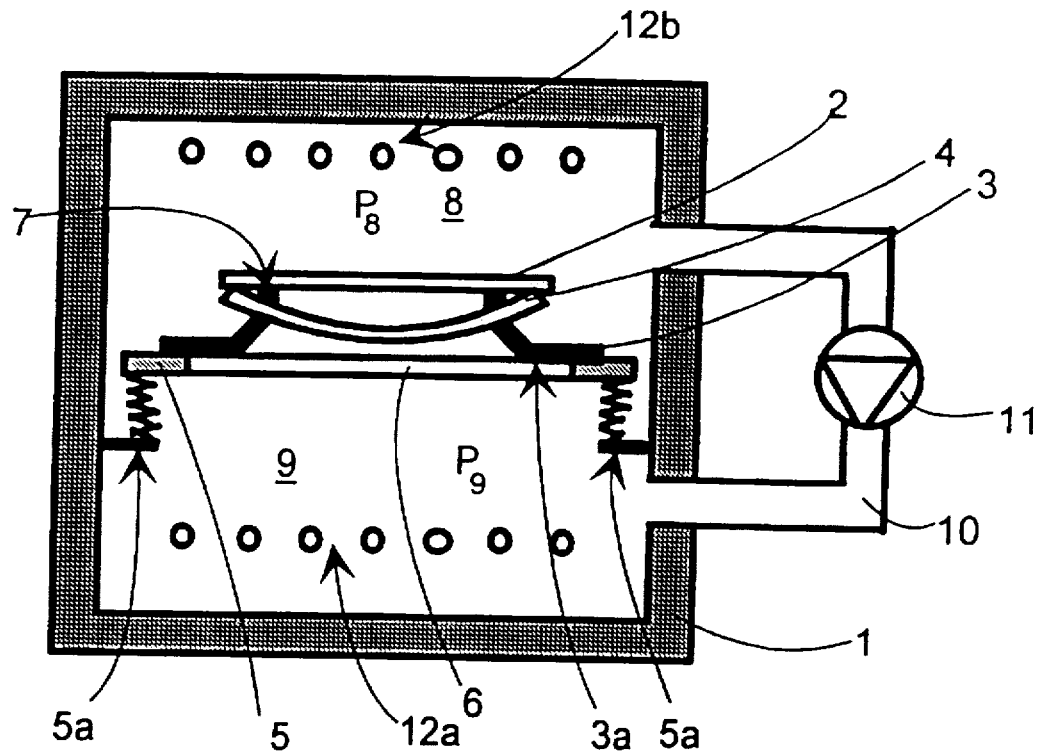
FIG. 1 shows schematically a vertical cross-sectional view of the first step of applying the method according to the invention, i.e. the heating step, in a first apparatus embodiment.

Using different methods known from the prior art, the glass sheet 2 can be transferred to the position shown in FIG. 1 on the bearing of the second supporting device 4 provided with wheels 4a (cf. FIGS. 4 and 6) or the like in compartment 1 which, for the time of applying the method, can be formed into a closed space also in the direction of travel of the glass sheet (i.e., in a direction perpendicular to the direction of FIG. 1). The compartment 1 comprises a bottom, a roof, and side walls, which are closed and heat-insulated. The glass sheet 2 is positioned beside the supporting device in the vertical direction.

According to the invention, the supporting device 3, 4 consists of a first supporting device 3 and a second supporting device 4. In the embodiment shown in FIG. 1, these supporting devices are placed above the upper surface of a horizontal partition wall 5. In this embodiment, the upper surface of the horizontal partition wall 5 is used as a bearing support for the first supporting device 3. The first supporting device 3, in turn, is inserted in an opening 6 in the horizontal partition wall 5, to be transferred with the horizontal partition wall 5 in the vertical direction within the compartment 1 in a manner to be described below in more detail. Consequently, the first supporting device 3 has, at least in the section supported by the sheet 2, a cross-sectional skeleton or tubular form corresponding to the configuration of the glass sheet, its outer surface or bottom being supported by and sealed against the edge of the opening 6.

In connection with the horizontal partition wall 5, e.g. underneath it, accordion-type means, guides, slide bars or the like 5a are arranged, by means of which the horizontal partition wall 5 can move in the vertical direction within the compartment 1. As a result the upper end surface 7 of the first supporting device 3, in the position shown in FIG. 1, forms an even surface and is pressed against the margins of the lower surface of the glass sheet 2, so that the central (bending) area of the glass sheet 2 is left within the skeleton form limited by the end surface.

Thus at this stage of applying the method, two parts are formed in the compartment 1, separated from each other, namely the upper part 8 and the lower part 9 of the horizontal partition wall 5. Consequently by means of a channel system 10 connected at its opposite ends to the upper and lower parts 8, 9, as shown e.g. in FIG. 1, and a blower 11 in the channel system 10, can create between the upper and lower part a pressure difference $P_9 > P_8$. This is maintained by a temporary partition wall consisting of the horizontal partition wall 5, the first supporting device 3 and the glass sheet 2. Consequently, heating of the glass sheet can be started in the compartment 1 with heating devices 12a and 12b, particularly thermal radiators placed e.g. in connection with the upper part 8 of the compartment 1 in the roof of the compartment 1 or also in connection with the lower part 9.

Simultaneously, a pressure difference is created either statically or dynamically, between the lower and upper parts of the compartment so that the pressure is higher in the lower part 9 than in the upper part 8. As a result, the glass sheet 2 to be heated to the tempering temperature is supported from below, whereby the planar form of the glass sheet is maintained also in its central section which is placed inside the annular form of the first supporting device 3 and subjected to the higher pressure $P_9$ effective in the second |lower| part 9. The second supporting device 4 is outside the first supporting device 3 either loose from the glass sheet (cf. FIG. 3) underneath its lower surface or partly in contact with the glass sheet (cf. FIG. 1), the supporting devices being concentric in the vertical direction.

Figure 2:
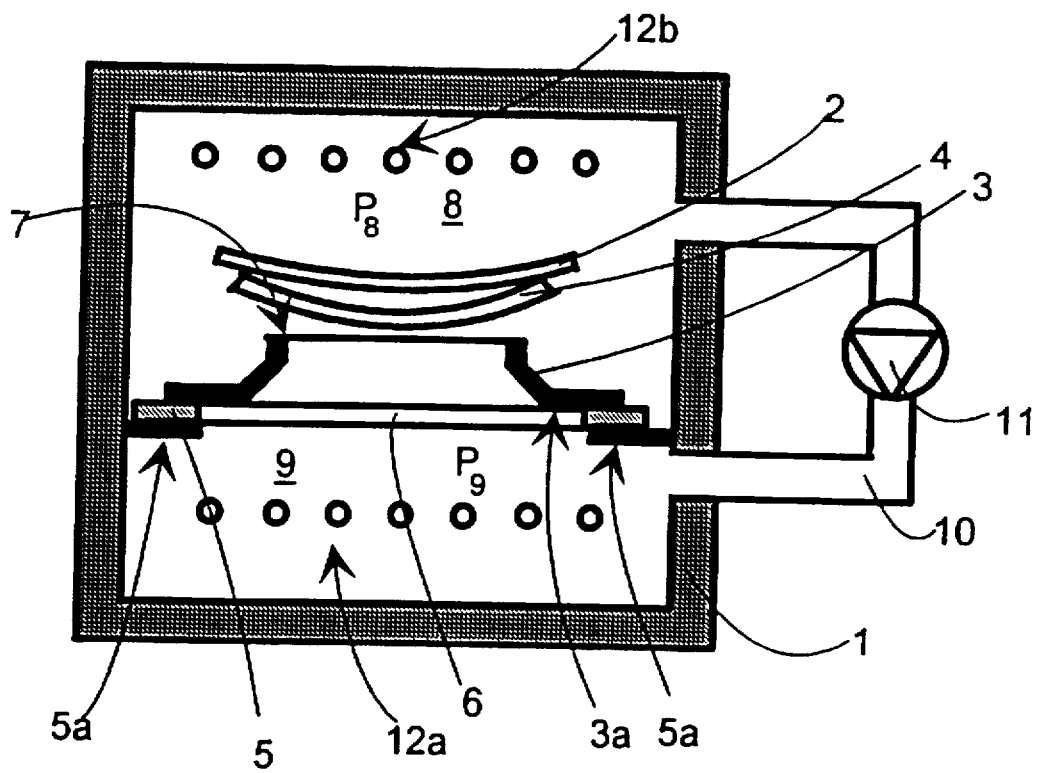
FIG. 2 shows schematically a vertical cross-sectional view of the second step of applying the method according to the invention, i.e. the bending step in the first apparatus embodiment.

When the heating has proceeded to such a step that the glass sheet has reached the tempering temperature, the first supporting device 3 is lowered down from the position of FIG. 1 to the position of FIG. 2, where it is in the horizontal direction entirely underneath the second supporting device 4, thus allowing at a later stage the transfer of the second supporting device 4 and the bent glass sheet 2 supported by it forward to the next compartment in the bending and tempering furnace apparatus, particularly to the tempering station. When the first supporting device 3 is moved downwardly, the glass sheet 2 is supported at its margins by the second supporting device and the pressure difference is removed by active measures e.g. by opening a connection outside the compartment 1 in the part 8 and/or 9. Alternatively it is levelled out in a natural way when the pressure medium connection is opened by removing the end surface 7 of the first supporting device 3 from contact with the lower surface of the glass sheet 2, whereby the glass sheet 2 is free to bend to the bending configuration determined by the second supporting device.

Figure 3:
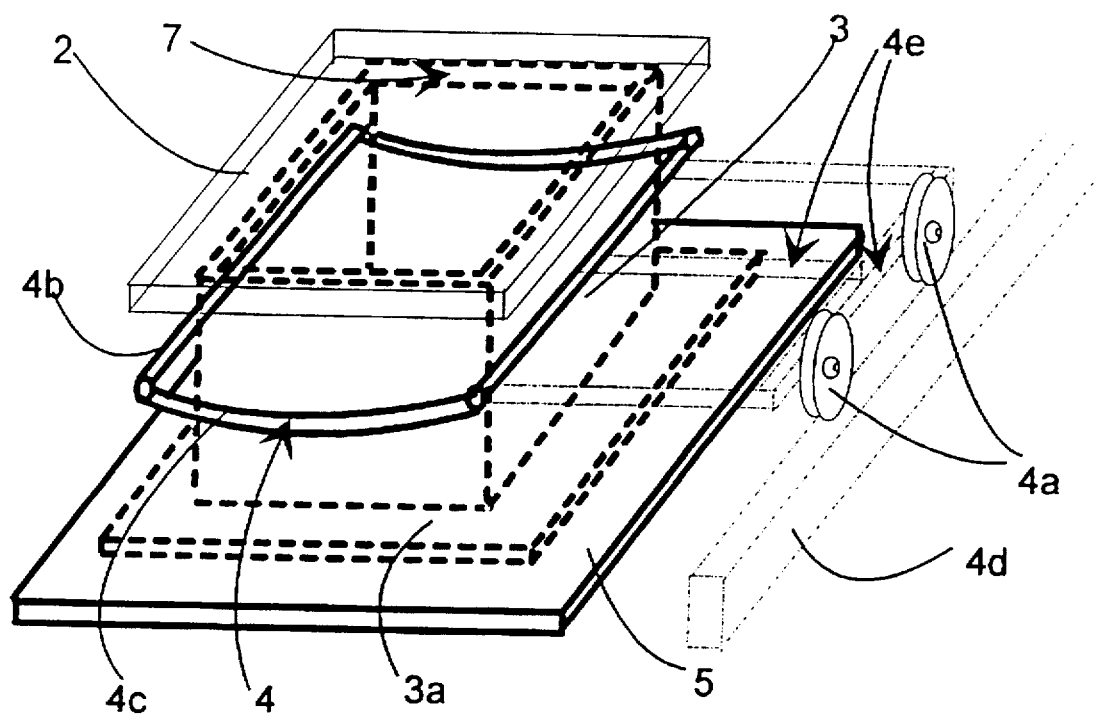
FIG. 3 shows the step of FIG. 1 in a perspective view.

FIG. 3 shows further the step of FIG. 1 in a perspective view to illustrate the construction. The second supporting device 4 consists of straight side elements 4b and curved end elements 4c, wherein the glass sheet is bent into a substantially rectangular cylindrical surface. FIG. 3 shows also schematically how the second supporting device 4 is supported to the slide bar 4d in the wall of the compartment 1. Wheels 4a or the like are connected to the second supporting device 4 with a horizontal supporting structure 4e.

Figure 4:
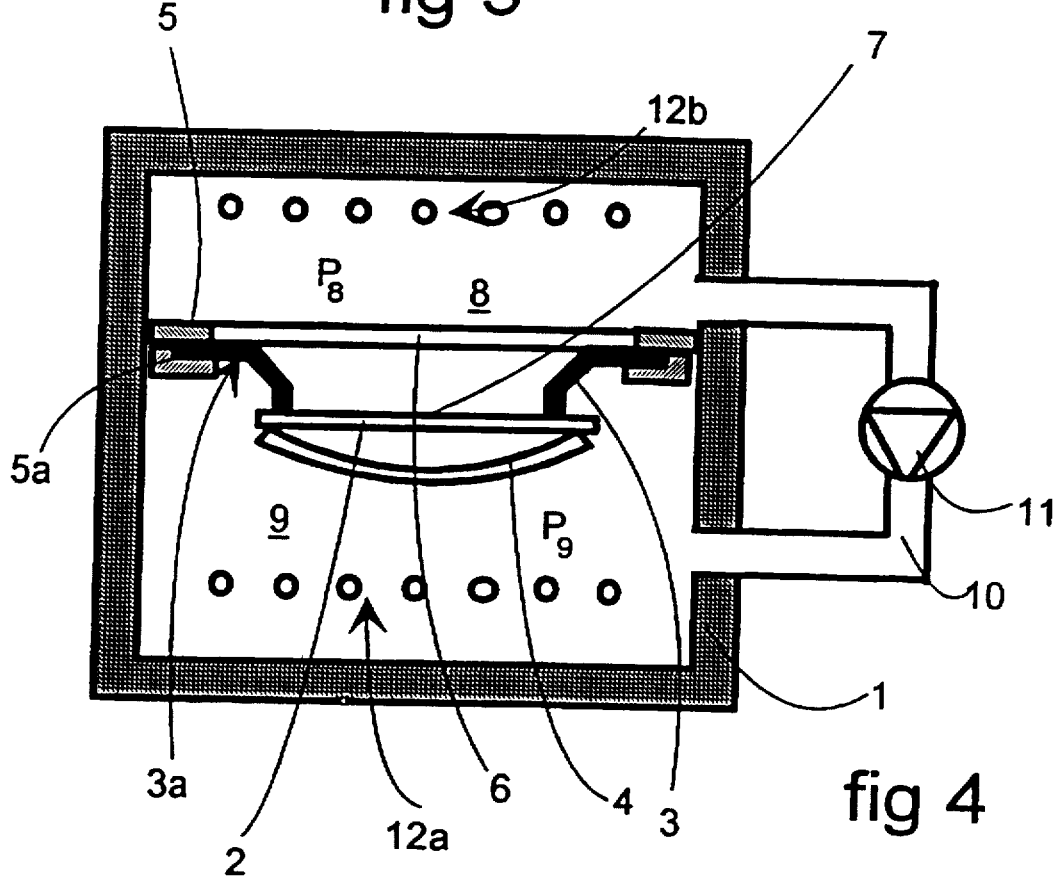
FIG. 4 shows schematically a vertical cross-sectional view of the first step of applying the method according to the invention in a second apparatus embodiment.

FIG. 4 shows an embodiment of the apparatus according to the invention, wherein the first supporting device 3 is placed upside down above the glass sheet 2. In other respects, the supporting device 3 fully corresponds to the supporting device shown in FIG. 1, whereby its base element 3a has fixed external dimensions, as also in the embodiment of FIG. 1. The mounting is best arranged with a groove 5a or the like, as shown in FIG. 4.

The glass sheet 2 is thus supported by means of the pressure difference, as in FIG. 1, but the support is now primarily due to an underpressure above the glass sheet 2 and not an overpressure below the glass sheet 2 as in the apparatus of FIG. 1.

Because the supporting devices 3 and 4 are placed at different sides of the glass sheet 2, it is possible to substantially avoid relative transfers of the supporting devices. The glass sheet 2 is thus moved on the bearing of the first supporting device 3 simply by bringing the glass sheet 2 close to the first supporting device 3, underneath it, e.g. on the bearing of the second supporting device 4, and by creating an underpressure above and below the glass sheet 2, so that the glass will rise against the supporting surface 7.

The transfer from the first supporting device 3 and from the pressure bearing back to the second supporting device 4 after the heating step is conducted only by removing the pressure difference and possibly by creating a small positive releasing pressure above, whereby the glass sheet 2 is released smoothly from the first supporting device 3 to the bearing of the second supporting device 4 and begins to bend. The transfer of the glass sheet 2 to the tempering station can be started immediately.

Avoiding a transfer in the vertical direction naturally requires that the upper surface of the glass sheet 2 is close to the planar surface of the first supporting device 3 so that the elevation will be successful. In any case, relative movement of the supporting devices can in this case be limited to only a small tightening movement.

Another advantage of this embodiment is that the glass sheet 2 can be brought e.g. from a preheating furnace to the first supporting device 3 by a separate transfer device, left on the support of the supporting device 3 for final heating, and heated in this position according to the invention. During this time, the second supporting device 4 can transfer another glass sheet 2 to the tempering station and carry out tempering of this glass sheet 2. When the tempering is finished and the glass sheet 2 removed from the supporting device 4, it can enter the furnace and lift the glass sheet 2, heated to the tempering temperature in the meantime, from the supporting device 3. According to this method, production capacity can be considerably increased, because the same second supporting device 4 does not need to be under the glass during final heating.

When the first supporting device 3 is placed above the glass sheet 2 and the second supporting device 4 under the glass sheet 2, there is also the advantage that the pressure difference effect can be directed to a wider area, so that the external area of the supporting surface 7 placed in the margins of the glass, not supported by the pressure difference, becomes shorter and the risk of its bending by gravity is reduced.

Because car panes are often screencoated and the screencoating is in practice always in the margins of the glass sheet 2, there is a risk that the screencoating may be damaged by contact of the supporting surfaces. At the bending step, silk screen ink is in practice without exception, on the top because it is easily damaged at low temperatures. Even when hot (at a temperature of about 600° C.), it can be damaged and cause staining of the countersurface e.g. in known vacuum pick-up and press bending methods.

Consequently, compressed air can be led via small nozzles to the countersurface 7 of the first supporting device 3 to prevent a damaging contact of the glass sheet and said surface when the glass sheet is supported by pressure. Thus the frictional effect between the glass sheet and the supporting surface is eliminated. Movement of the glass sheet in the horizontal direction during heating can be prevented e.g. by stoppers provided in the supporting device 4 (or 3), effective on the margins of the glass sheet 2.

The support and transfer mechanisms of the supporting device 4 are not shown in the figure, because they are not related to the invention and are known in the prior art, corresponding e.g. to FIG. 3.

Figure 5:
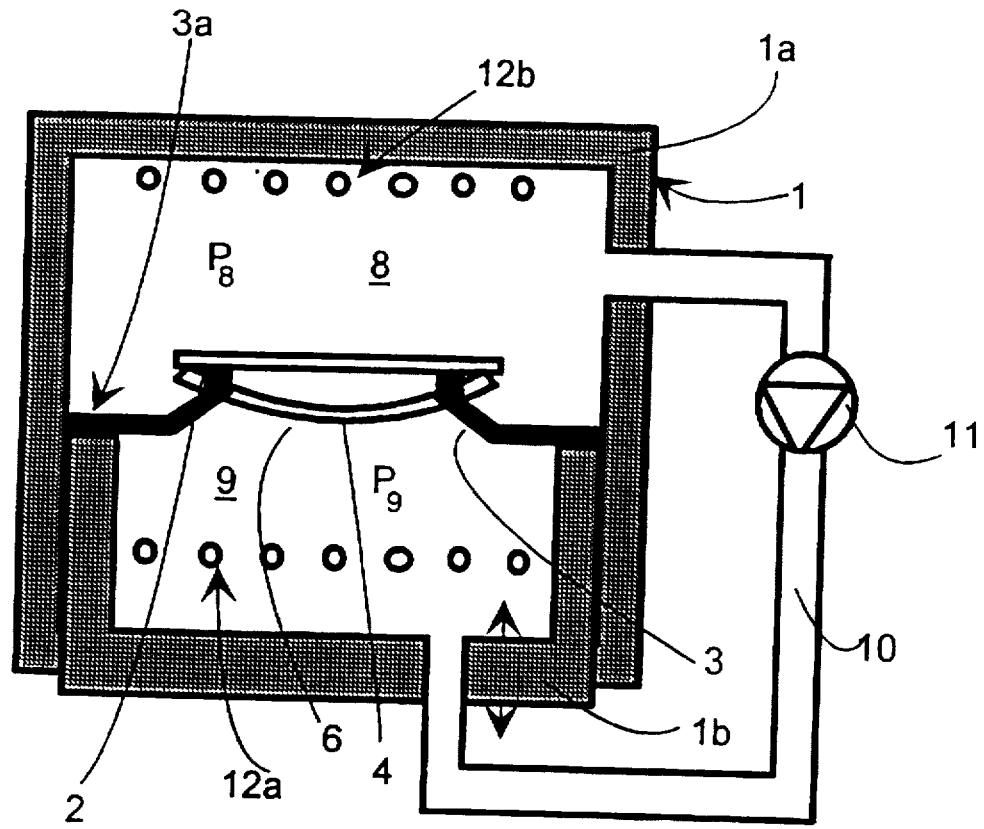
FIGS. 5 and 6 show also schematically third and fourth apparatus embodiments applying the method of the invention.

FIG. 5 shows a third embodiment where the compartment 1 consists of two parts; in other words, the upper 1a and lower sections 1b of the compartment are separate, and actuators (not shown) are provided to be effective between them to move the parts 1a and 1b in relation to each other in vertical direction. In this embodiment, the horizontal partition wall is the base element 3a of the first supporting device 3 supported to the end surfaces of the walls of the lower section 1b of the compartment 1, the walls being placed inside the compartment 1.

Figure 6:
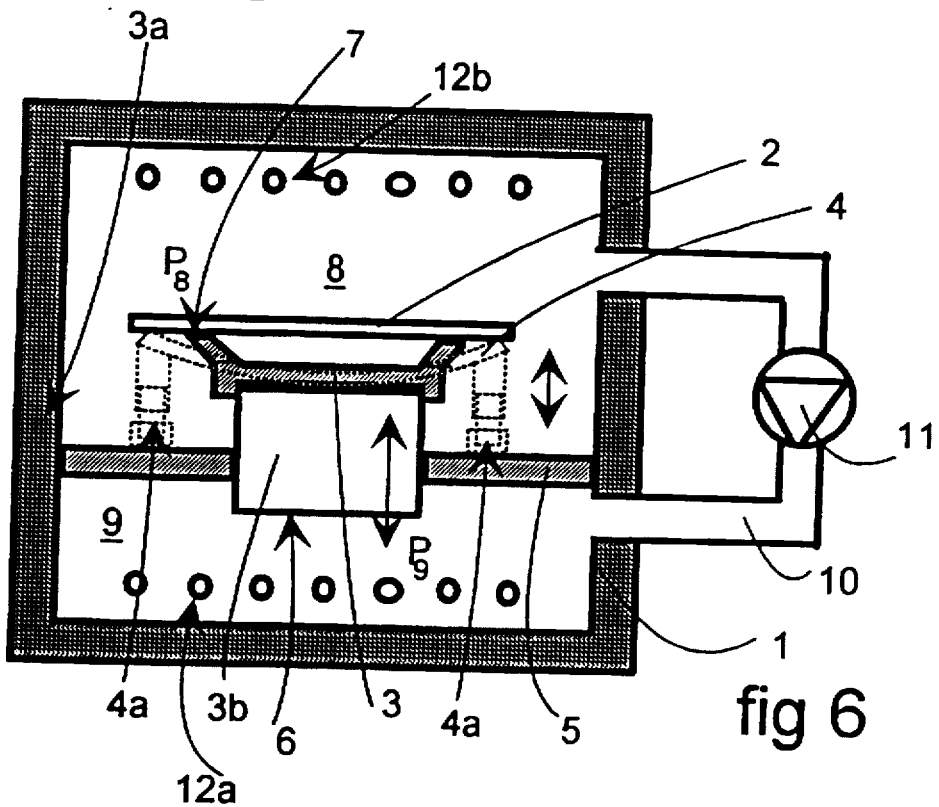

FIG. 6, in turn, shows a fourth embodiment, wherein the first supporting device 3 is arranged to move with a tube or the like moving in relation to the horizontal partition wall 5. The horizontal partition wall 5 is thus fixed in a stationary manner to the inner walls of the compartment. Each first supporting device 3 has clamps which are compatible with the tube 3b or the like.

Further, the apparatus can be arranged in such a manner that the horizontal partition wall 5 is made entirely stationary, including the tube 2a, wherein the vertical transfer of the first supporting device 3 is avoided by using e.g. a telescopic lifting and lowering arrangement of the second support device 4 shown in FIG. 6 for the transfer of the glass sheet 2. This results in the advantage that problems caused by a movable packing in a hot space are avoided.

Alternatively, both the vertical transfers of the second supporting device 4 (cf. FIG. 6), the glass sheet 2 being brought at the supporting device 3, and vertical transfers of the first supporting device 3, using a tube 3a or the like can be used. During the final heating, the second supporting device 4 is elevated above the supporting surface 7 in a corresponding manner, e.g. by using the combined movement presented above, before starting the horizontal transfer.

The planar glass sheet 2 can be also bent somewhat upwardly during the heating phase to get an adequate bending period, especially when the curvature of the glass is large. Thus the glass sheet 2 maintains the overall or substantially planar shape during the heating.

I claim:

1. A method for bending and tempering a glass sheet, said method comprising the steps of:

supporting margins of said glass sheet in a substantially planar shape with a first supporting device;

heating said glass sheet at least from a softening temperature to a tempering temperature while said glass sheet is supported by said first supporting device;

during said heating, maintaining the substantially planar shape of said glass sheet by creating a non-contact pressure difference between upper and lower surfaces of said glass sheet, said pressure difference being at least within an area defined by said first supporting device;

removing said pressure difference when said glass sheet is at least at the tempering temperature; and substantially concurrently with said removing step, placing said glass sheet in connection with a second supporting device wherein said glass sheet is bent to a configuration according to a shape of said second supporting device.

2. The method according to claim 1 wherein said placing step comprises the step of moving the first and second supporting devices in relation to each other in the vertical direction whereby the glass sheet is transferred from one supporting device to the other.

3. The method according to claim 1 wherein said first and second supporting devices are arranged to support said glass sheet on the side of said lower surface.

4. The method according to claim 1 wherein said first supporting device is arranged to support said glass sheet on the side of said upper surface and said second supporting device is arranged to support said glass sheet on the side of said lower surface.

5. The method according to claim 1 further comprising the steps of:

providing a horizontal wall with an opening system in a compartment of tempering apparatus;

arranging said first supporting device to be movable in relation to said horizontal wall;

dividing said compartment into two areas with said horizontal wall, said first supporting device and said glass sheet, and wherein said pressure difference is created between said two areas.

6. The method according to claim 1 wherein said heating is accomplished by heating resistances arranged above and below said glass.

7. The method according to claim 1 further comprising the steps of:

dividing a furnace into a low pressure area and a high pressure area separated by a partition wall and an opening in said first supporting device;

closing said opening with the glass being heated during final heating stages; and taking air from said low pressure area and transferring it to said high pressure area.

8. Apparatus for bending and tempering a sheet of glass, said apparatus comprising:

a compartment;

heating devices arranged in said compartment;

a horizontal partition wall dividing said compartment into an upper and lower areas and having an opening therein;

means for creating a pressure difference between said upper and lower areas;

a first supporting device arranged over said opening and forming a substantially planar support surface for the margins of a glass sheet, said first supporting device being displaceable in a vertical direction and arranged to support said sheet of glass from above; and a second supporting device, corresponding to a desired bent shape of said glass sheet, arranged below said first supporting device.

9. The apparatus of claim 8 wherein said horizontal wall is moveable in the vertical direction and said first supporting device connected to said horizontal wall.

10. Apparatus for bending and tempering a sheet of glass, said apparatus comprising:

a compartment comprising an upper part and a lower part moveable in relation to one another in a vertical direction;

heating devices arranged in said compartment;

a first supporting device having an opening and forming a substantially planar support surface for margins of a glass sheet, said first supporting device having a base element connected to one of said upper and lower parts whereby said base element and said glass sheet supported on said first supporting device divide said compartment into upper and lower areas;

a second supporting surface corresponding to a desired bent shape of said glass sheet arranged below said first supporting device; and means for creating a pressure difference between said upper and lower areas.

* * * * *